UNITED STATES PATENT OFFICE.

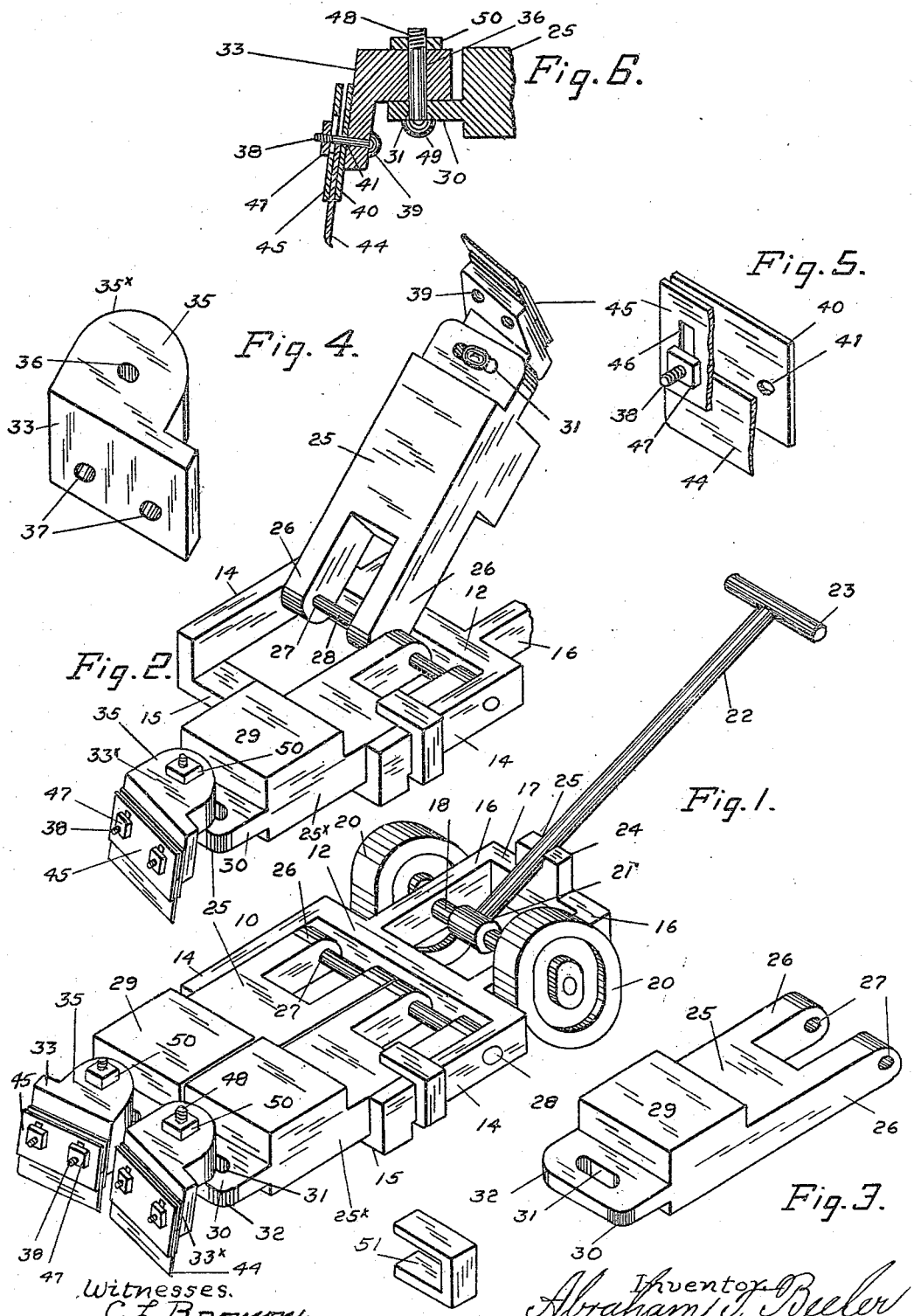
A. T. BEELER.
FLOOR SCRAPER.
APPLICATION FILED AUG. 30, 1909.
960,787.
Patented June 7, 1910.

ABRAHAM T. BEELER, OF KANSAS CITY, MISSOURI, ASSIGNOR OF ONE-HALF TO ISAAC W. BEELER, OF KANSAS CITY, KANSAS.

FLOOR-SCRAPER.

960,787.  Specification of Letters Patent.  Patented June 7, 1910.

Application filed August 30, 1909. Serial No. 515,269.

*To all whom it may concern:*

Be it known that I, ABRAHAM T. BEELER, a citizen of the United States of America, residing at Kansas City, in the county of Jackson and State of Missouri, have invented certain new and useful Improvements in Floor-Scrapers; and I do hereby declare that the following is a full, clear, and exact description of the invention, such as will enable others to make and use the same, reference being had to the accompanying drawing, forming a part of this specification.

The invention relates to and is an improvement upon the device for scraping and dressing wood surfaces, for which Letters Patent of the United States were granted jointly to myself and Isaac W. Beeler, June 29, 1909, No. 926,458.

The object of the invention is: first, to enable the irregularities in the height of floor boards in laid floors to be dressed, and the surfaces brought to a uniform level, without diversion of the draw blades, and with a yielding adaptation of the blades to the unequal surfaces to be dressed; second, to enable the immediate reduction of cross grained surfaces to a smooth condition.

The invention consists in the novel construction and combination of parts, such as will be first fully described, and then specifically pointed out in the claims.

In the drawings: Figure 1. is a view in perspective of the wheeled scraper, embodying the invention. Fig. 2. is a detail view, in perspective, of the main portion of the supporting frame and the independent weighted bodies carrying the scraper heads, one of which is raised in the position taken when the device is transported. Fig. 3. is a detail view, in perspective, of one of the weighted bodies on the carrier frame. Fig. 4. is a detail view, in perspective, of one of the scraper-carrying, adjustable heads. Fig. 5. is a detail view of the adjustable plates on the heads carrying the scraper blade or bit. Fig. 6. is a vertical, sectional view, taken upon the carrying head and scraper-blade or bit, and a portion of the flange on the weighted body. Fig. 7. is a detail view of the detachable clamp or clevis securing the scraper-carrying head to the frame.

Similar numerals of reference indicate corresponding parts in all the figures of the drawing.

Referring to the drawing, 10 indicates the main carrier frame of the device, which is U-shape in form, and consists of the transverse bar 12, from the ends of which extends rearwardly the parallel portions 14, 14, and with the lower surfaces and outer ends of the portions 14 are connected integrally the ends of a transverse supporting bar 15. With the outer surface of the transverse bar 12, at approximately one-third the distance inwardly from its ends are connected integrally the inner ends of the forwardly-extended parallel bars 16, which are comparatively the same length as the bars 14, and with the forward ends of these bars 16 are connected integrally the ends of a transverse bar 17. The tilting frame thus described is arranged in a horizontal position, the width of the portion of the frame between the bars 14 being such as to permit of the assemblage of independent weighted bodies, supporting the scraper blades, as further described.

Through the bars 16, of the carrier frame, extend the ends of an axle 18, and upon the ends of said axle are mounted the carrying wheels 20. Upon the central portion of the axle 18 is a sleeve 21, with which sleeve is rigidly connected the lower end of the drawing handle 22, to the carrier frame, the upper end of which handle extends upwardly and forwardly a considerable distance, and provided with a cross handle bar 23. On the upper surface of the transverse bar 17 is a block 24, shown integral with the bar, in the upper surface of which block is a depression or notch 25, which forms a bearing or fulcrum for the handle 22, when leverage is necessary to be applied to the carrier frame 10.

25 and 25× indicate independent weighted bodies within the sides 14, of the rear portion of frame 10, and consist essentially of metal castings of equal width, each casting having forked extensions or arms 26, extending in the direction of and to a position adjacent the inner surface of the transverse bar 14, of frame 10, the said ends having transverse perforations 27, the perforations in the arms 26, of each body registering with each other. The surfaces at the ends of said arms are curved or rounded. Through the sides 14, of the rear portion of frame 10, near their points of connection with the transverse bar 12, extend the ends of a rod 28, which rod extends through the perforations 27, of the arms 26, of the weighted bodies 25, 25ˣ, and forms a pivot for said arms.

The rear ends of the weighted, pivoted bodies or castings 25 and 25ˣ are supported upon the upper surface of the transverse bar 15, of frame 10, when in position horizontally, and for operation of the scraping blades, and extend a considerable distance outwardly from the line of the rear ends of the bars 14. The upper surfaces of the portions of the weighted bodies or castings between the bars 14 are in their horizontal position flush with the upper surfaces of the bars 14. The upper surfaces 29, of the rear ends of the said bodies, extend upwardly above the line of the forward upper surfaces of these bodies a considerable distance, so as to afford additional weight to the bodies, as further described.

Upon the rear ends of the weighted bodies 25, 25ˣ, are horizontally and rearwardly-extended supports or flanges 30, located a short distance upwardly from the horizontal line of the lower surfaces of the respective weighted bodies. These flanges are each provided with elongated openings or slots 31, extending vertically through the flanges and also in a transverse direction to the weighted body. The corner portions of the flanges 30 are curved or rounded, as at 32, for purposes which will hereafter appear.

33 and 33ˣ indicate the adjustable scraper-carrying heads or plates upon the upper, inner portions of which heads are horizontal supporting lugs 35, the outer portions of which lugs are curved in the arc of a circle at 35ˣ. These lugs are provided, respectively, with a bolt opening 36, and are mounted on the upper surface of the respective flanges 30, of the weighted bodies 25, 25ˣ. The respective heads 33 and 33ˣ, extend downwardly a short distance below the line of the lower surfaces of the flanges 30, and the outer faces of said flanges incline downwardly and rearwardly in respect to the upper surfaces of the lugs 35, in the proper degree.

Through the lower portions of the respective heads 33 and 33ˣ, extend separate bolt openings 27 (see Fig. 4), in which openings are the threaded bolts 38, having heads 39. 40 indicates flat clamping plates, which are placed on the outer surface of the heads 33, 33ˣ, and extend downwardly a short distance below the line of the lower surfaces of said heads. In the said plates 40 are transverse bolt-openings 41, registering with the bolt-openings 37, in said heads 33, 33ˣ, and through which the bolts extend. 44 indicates the cutting blade or bit, the lower cutting edge of which is upset, as seen in Fig. 6, so as to obtain the proper scraping angle in its relation to the surface to be dressed. These blades are placed on the outer surface of the plates 40, the upper portion of which are below the bolts 38. Upon the outer surfaces of the respective blades 44 are placed flatwise the outer clamping plates 45, the upper portions of which extend upwardly the desired height above the line of the bolt-openings 37, in the heads 33, 33ˣ, and are provided with the vertical slots 46, through which the bolts 38 extend, and upon the outer ends of which bolts are clamping nuts 47. These heads 33, 33ˣ are secured to the flanges 30, of the respective weighted bodies by the threaded bolts 48, having heads 49, bearing on the lower surfaces of the flange 30. Upon these bolts 48 are adjusting nuts 50, which hold the heads 33, 33ˣ, in an adjusted position, the bolts 48 serving as pivots for the angular adjustment of said heads. For the purpose of securing the rear portion of frame 10 horizontally with the weighted bodies 25, 25ˣ, I employ a U-shaped clamp or clevis 51, as seen in detail in Fig. 7. One clevis is sufficient, the upper and lower horizontal portions of which extend over the respective upper and lower surfaces of one side 14, of the frame 10, and upon the respective surfaces of the adjacent weighted body. In the horizontal position of the weighted bodies 25, 25ˣ, the scrapers 44 rest upon the surface of the floor, the wheels 20 supporting the forward end of the carrying frame.

In the application of the scrapers to the floors to be dressed the blade-carrying heads 33, 33ˣ, are preferably adjusted in position so as to incline the cutting blades at opposite angles and inwardly. Power is then applied to the handle 22, and the wheeled frame 10 is moved forwardly, drawing the cutting blades over the surface of the floor, the blades removing a thin shaving from the surface of the floor in the line of movement, and which are thrown outwardly from the inner ends of the blades.

In matched boards the surfaces of adjacent boards frequently vary in height, and in meeting said raised surfaces one of the weighted bodies yields upwardly under the weight of the body, and prevents counteraction upon the other blade, which would tend to divert or slew around the rear end of the wheeled carriage.

The advantage of the independency of the blades consist in being enabled to re-pass cross-grained surfaces, and thereby leave a smooth finished surface, which may be roughened in the angle presented by one cutting blade and the adjustment of the separate cutting heads are readily made to meet any condition of surface of the wood, so that in the removal of the surfaces of various kinds of wood the adaptation of the blades may be specifically made thereto, and these surfaces may be other than floors.

It may be observed that on the dressing of floors, the increased weight of the bodies 25, 25ˣ, is requisite in the application of speed to the carrying frame 10, the weight serving to increase the depth of cut of the blades.

When the device is transported the clevis 51 is removed, and both weighted bodies 25, 25ˣ raised in position and caused to incline rearwardly against bar 14. In the various angular adjustments of the heads 33, 33ˣ, they may be given various changes in position past the round or curved surfaces 32, of the flanges 30.

The means for dressing wood surfaces may in the employment shown and described be employed in various capacities, and such changes in details of construction and proportions may be employed without departing from the scope of the invention.

Having fully described my invention, what I now claim as new and desire to secure by Letters Patent is:

1. In a floor scraper a wheeled carrier comprising a tilting carrier frame having longitudinal side bars, and parallel weighted bodies in rear of the carrier frame, scraping members carried by the said bodies, and arms connected with said bodies extending parallel in position with the side bars to said frame and pivoted thereto, means supporting the arms on the carriage in rear of the pivotal point of said arms on said side bars and means for clamping one of said arms on one of said weighted bodies with a corresponding side of the carriage frame.

2. In a floor scraper a wheeled carrier comprising a tilting carrier frame having longitudinal side bars an axis intermediate the ends of said frame, and parallel weighted bodies in rear of the said frame, scraping members carried by said bodies, arms on said bodies extending parallel in position to and within the side bars of said carrier frame and pivoted thereto, a transverse bar secured to the lower surfaces and rear ends of the side bars to said frame, and a clamp on one of the side bars for clamping one of the arms on one of the weighted bodies thereto.

3. In a floor scraper a wheeled carrier comprising a tilting carrier frame having longitudinal side bars, and an axis intermediate the ends of said frame, a handle connected yieldingly with said axis and a fulcrum for said handle on the forward end of the said frame, weighted bodies in rear of said frame, and scraping members carried by said bodies, arms connected with said bodies and extending parallel with the side bars to said frame and pivoted thereto, a transverse supporting bar on the said side bars extending beneath the said arms on said weighted bodies, and a clamp extending over the upper and lower surfaces of one of said side bars and one of said arms on one of the weighted bodies.

4. In a floor scraper a tilting wheeled carrier frame, a handle connected with the axial support to said frame and having a fulcrum at one end of said frame, weighted pivoted bodies within said frame adapted to be raised in position, scraping members carried by said weighted bodies, and securing means for said frame for securing said weighted bodies from movement.

5. In a floor scraper the combination with a movable carrier frame, a transverse rod extending through said frame, weighted bodies having forked extensions pivotally connected with said rod, a support for said weighted bodies at the rear end of said frame, and floor scraping members connected with said weighted bodies.

ABRAHAM T. BEELER.

Witnesses:
  A. L. GREER,
  M. E. SLAGE.